US012692731B2

(12) United States Patent
Kimel

(10) Patent No.: US 12,692,731 B2
(45) Date of Patent: Jul. 28, 2026

(54) MOTOR VEHICLE LOCK

(71) Applicant: Kiekert Aktiengesellschaft, Heiligenhaus (DE)

(72) Inventor: Viktor Kimel, Essen (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 0 days.

(21) Appl. No.: 19/104,528

(22) PCT Filed: Sep. 6, 2023

(86) PCT No.: PCT/EP2023/074413
§ 371 (c)(1),
(2) Date: Feb. 18, 2025

(87) PCT Pub. No.: WO2024/052390
PCT Pub. Date: Mar. 14, 2024

(65) Prior Publication Data

US 2026/0062965 A1 Mar. 5, 2026

(30) Foreign Application Priority Data

Sep. 6, 2022 (DE) ..................... 10 2022 122 496.1

(51) Int. Cl.
*E05B 81/14* (2014.01)

(52) U.S. Cl.
CPC .................................... *E05B 81/14* (2013.01)

(58) Field of Classification Search
CPC .......... E05B 81/14; E05B 81/36; E05B 81/46; E05B 81/06; E05B 81/90; E05B 81/42; E05B 81/16; E05B 81/04; E05B 81/44; E05B 81/25; Y10T 292/1047; Y10T 292/57; Y10T 292/108; Y10S 292/43
(Continued)

(56) References Cited

U.S. PATENT DOCUMENTS 10,519,700 B2 * 12/2019 Mazal ..................... E05B 81/15
11,536,056 B2 * 12/2022 Fuchs ..................... E05B 81/16
(Continued)

FOREIGN PATENT DOCUMENTS

DE 4037637 A1 6/1992
DE 19913590 A1 * 10/2000 ............. E05B 81/16
(Continued)

OTHER PUBLICATIONS

International Search Report mailed Jan. 30, 2024, for International Application No. PCT/EP2023/074413.

*Primary Examiner* — Steven A Tullia
(74) *Attorney, Agent, or Firm* — Renner, Otto, Boisselle & Sklar, LLP

(57) ABSTRACT

The invention relates to a motor vehicle lock, in particular a motor vehicle door lock, which is equipped with a locking mechanism (1, 2) made up substantially of a rotary latch (1) and a pawl (2). In addition, a release lever (3, 4) is provided to actuate the pawl (2) and to open the locking mechanism (1, 2). According to the invention, the release lever (3, 4) is designed in two parts with a pawl release lever (3) acting on the pawl (2) and an actuating release lever (4) interacting with, for example, an actuating lever and/or drive. Both levers (3, 4) are either coupled together or decoupled from each other via a linearly displaceable coupling element (6).

10 Claims, 4 Drawing Sheets

Figure 2:
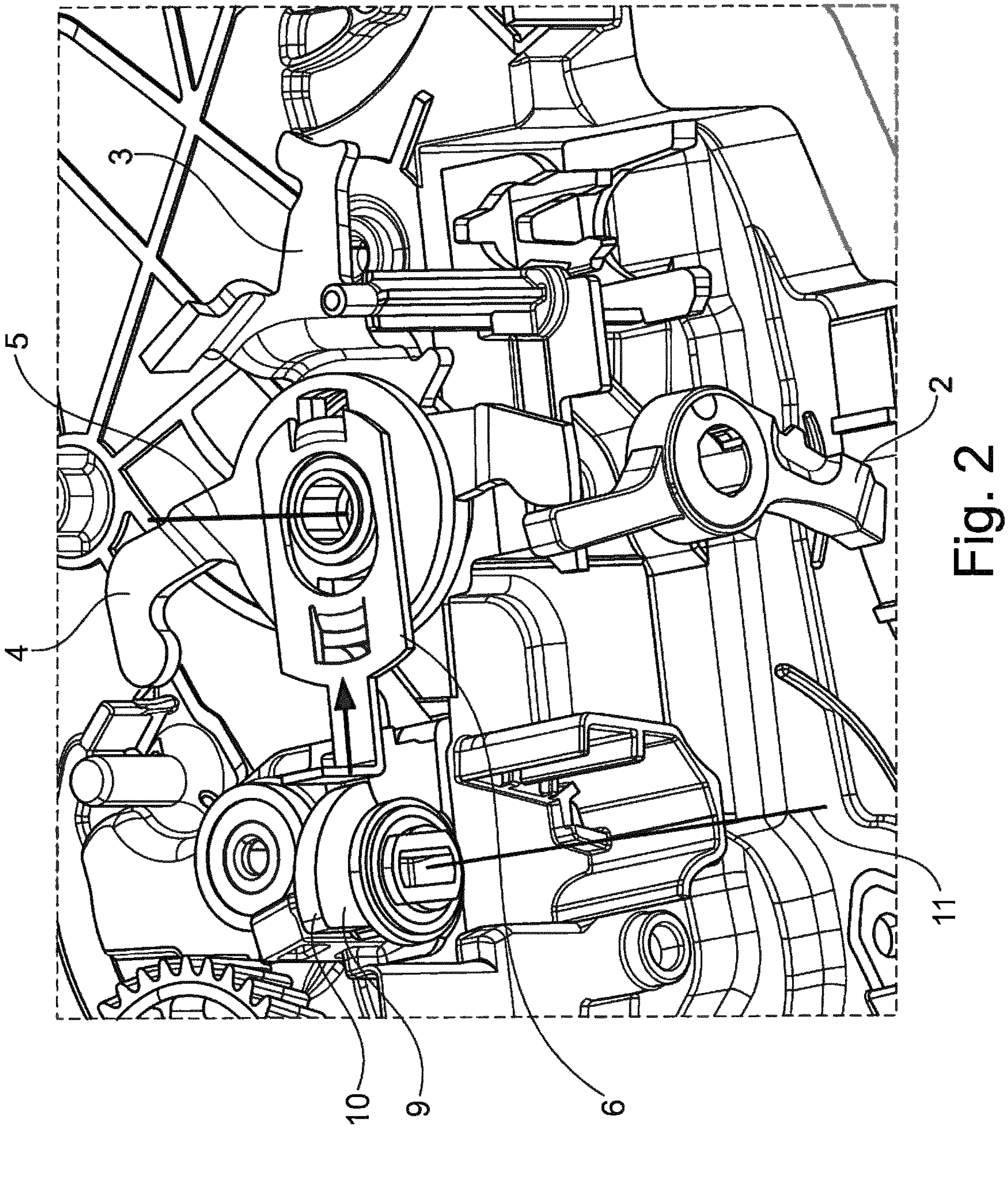

(58) Field of Classification Search
USPC .......................................................... 70/287.7
See application file for complete search history.

(56) References Cited

U.S. PATENT DOCUMENTS

| | | | | |
|---|---|---|---|---|
| 12,104,416 | B2 * | 10/2024 | Inan | E05B 81/16 |
| 2013/0161961 | A1 * | 6/2013 | Burciaga | E05B 81/34 292/100 |
| 2014/0203572 | A1 * | 7/2014 | Barmscheidt | E05B 81/06 292/200 |
| 2016/0060908 | A1 * | 3/2016 | Kim | E05B 79/20 292/336.3 |

FOREIGN PATENT DOCUMENTS

| | | | | | |
|---|---|---|---|---|---|
| DE | 10139975 | A1 | * | 4/2002 | E05B 81/14 |
| DE | 202007009441 | U1 | * | 9/2007 | E05B 81/16 |
| DE | 10131965 | B4 | * | 1/2009 | E05B 81/16 |
| DE | 102008057318 | A1 | * | 5/2010 | E05B 81/06 |
| DE | 102011018512 | A1 | * | 10/2012 | E05B 81/16 |
| DE | 102013019938 | A1 | | 4/2015 | |
| DE | 102015118860 | A1 | | 5/2017 | |
| DE | 102017124531 | A1 | * | 4/2019 | E05B 81/42 |
| DE | 102017127386 | A1 | * | 5/2019 | E05B 77/06 |
| DE | 102019131180 | A1 | | 5/2021 | |
| DE | 102019134511 | A1 | * | 6/2021 | E05B 77/04 |
| DE | 102019135230 | A1 | * | 6/2021 | E05B 81/16 |
| EP | 1323883 | A2 | * | 7/2003 | E05B 77/26 |
| EP | 1580366 | A2 | * | 9/2005 | E05B 81/14 |
| WO | WO-0231298 | A1 | * | 4/2002 | E05B 81/14 |
| WO | WO-0246557 | A2 | * | 6/2002 | E05B 81/42 |
| WO | WO-2019076403 | A1 | * | 4/2019 | E05B 81/90 |
| WO | WO-2021000992 | A1 | * | 1/2021 | E05B 85/02 |

* cited by examiner

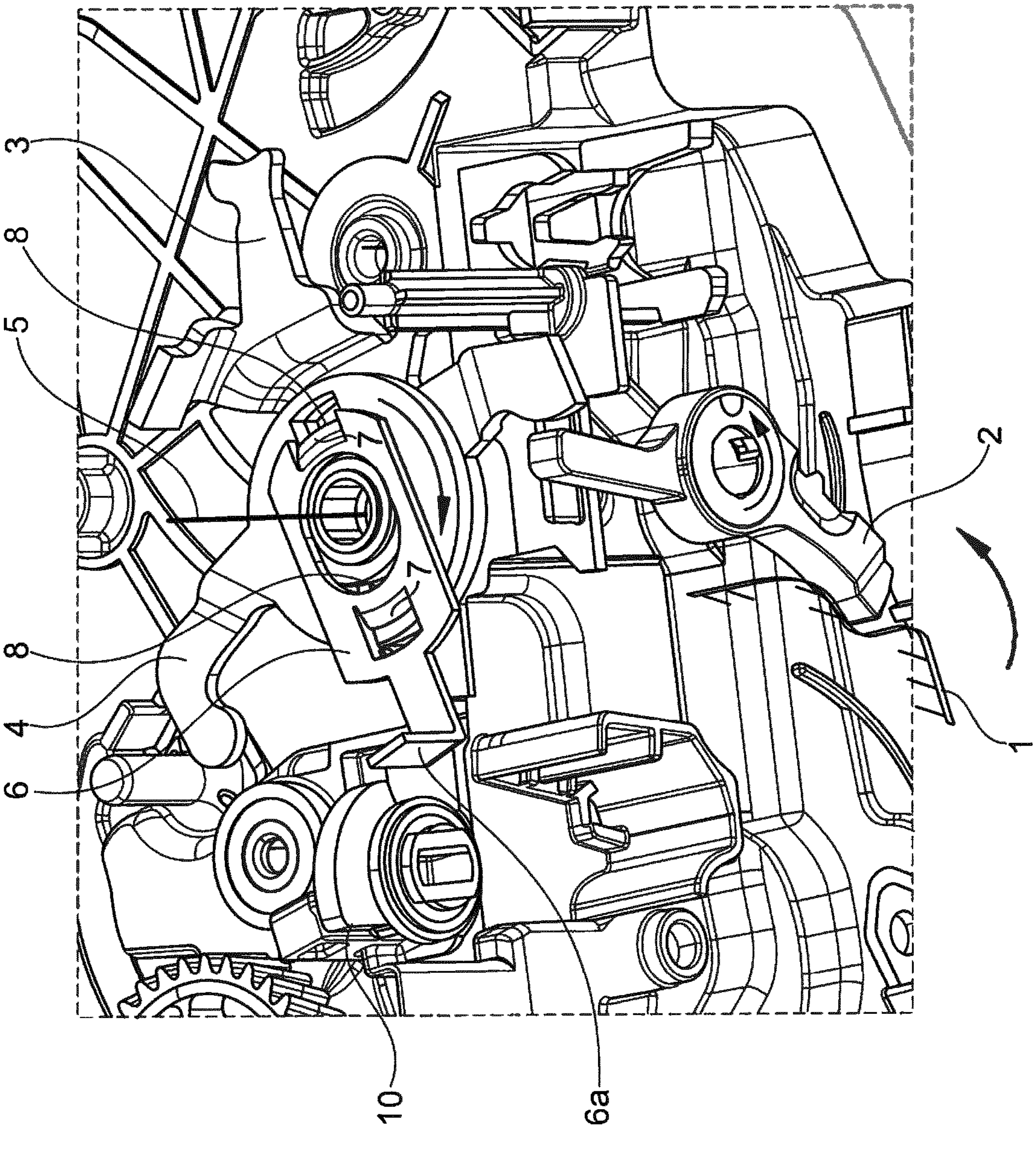
Fig. 1
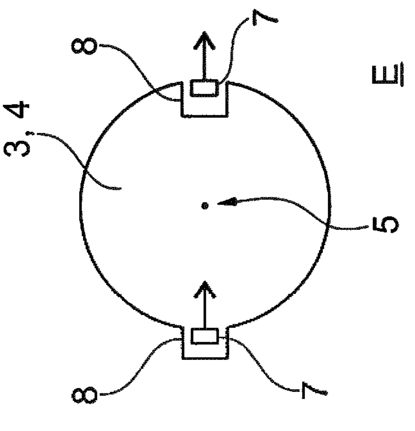

MOTOR VEHICLE LOCK

This application is a national phase of International Application No. PCT/EP2023/074413 filed Sep. 6, 2023, which claims priority to German Application No. 10 2022 122 496.1 filed Sep. 6, 2022, each of which is hereby incorporated herein by reference in its entirety.

The invention relates to a motor vehicle lock, in particular a motor vehicle door lock, with a locking mechanism made up substantially of a rotary latch and a pawl, and with a release lever to actuate the pawl and to open the locking mechanism.

Almost all motor vehicle locks used in practice and described in the literature have a release lever with which the locking mechanism can be opened. In this context, the term motor vehicle lock is to be understood broadly and refers not only to motor vehicle door locks, but also, for example, to motor vehicle locks in connection with the locking of seats, flaps, etc. Such motor vehicle locks are nowadays and increasingly operated by electric motors. This allows special comfort applications to be realized, and the operating forces are low.

However, with such motor vehicle locks with an electromotive opening drive, there is a risk that the electromotive opening drive will not be or not completely be reversed or return to its home position after an opening process, for example. This can happen, for example, when there is ice. This makes it possible and conceivable for the release lever to be at least partially blocked by the electromotive drive. The result is that following the desired opening process and with the rotary latch open, a subsequent closing process of an associated motor vehicle door is not possible or is blocked. This corresponds to a pawl that is not fully swung out in relation to the rotary latch so that the rotary latch may be blocked by the pawl following the opening process, and in any case, functional impairments cannot be completely avoided.

In the generic prior art according to DE 40 37 637 A1, there are already approaches for equipping the release lever with a memory device with the aid of which a release position of the release lever, once set, can be stored in memory until a closing movement of the motor vehicle door after it has been opened cancels the storage in memory. However, this is associated with a relatively complex memory device and an additional memory function limit switch, which further increases the effort. This is to indicate overall whether the release lever is in a stored position or not.

Apart from the fact that the aforementioned and generic prior art corresponds to a structurally complex solution, this approach can practically not be combined with an electromotive opening drive and is therefore unsuitable for current applications and requirements. The invention as a whole seeks to remedy this.

The invention is based on the technical problem of further developing such a motor vehicle lock and in particular a motor vehicle door lock in such a way that the design effort is reduced and a functional solution is provided which in particular enables a flawless locking process after opening a locking mechanism.

To solve this technical problem, a generic motor vehicle lock and in particular a motor vehicle door lock is characterized within the scope of the invention in that the release lever is designed in two parts with a pawl release lever acting on the pawl and an actuating release lever interacting with, for example, an actuating lever and/or a drive, wherein both levers are either coupled together or decoupled from each other via a linearly displaceable coupling element.

Within the scope of the invention, therefore, and based on the prior art referred to above, and very importantly, a two-part release lever is initially envisioned. In fact, the release lever consists of the pawl release lever and the confirmation release lever. While the pawl release lever primarily ensures that the pawl can be lifted from its locking engagement with the rotary latch when the locking mechanism is in the closed position, the actuating release lever usually introduces a pivoting movement into the release lever per se. In their basic design, both levers are designed to be functionally and mechanically separate.

Using the additionally provided coupling element, the two levers can now be coupled together or decoupled from each other as desired. When the two levers are coupled to each other, a rotationally fixed connection exists, so that force applied to the actuating release lever is transmitted and can also be transmitted to the pawl release lever which in turn then lifts the pawl out of its engagement with the rotary latch. As a result of this, the rotary latch can open with the assistance of a spring and can release an associated and previously captive locking bolt. In the case of the example, the door equipped with the relevant motor vehicle lock can be opened easily.

According to an advantageous embodiment, both aforementioned levers are mounted coaxially to each other around a common axis of rotation. The coupling element is also mounted on the same axis as the two levers. This allows the two levers to be pivoted together with the coupling element about the common axis of rotation. A major factor in this is the fact that the coupling element is designed to be linearly displaceable and is mounted, for example, on the actuating release lever or on both levers.

In order to achieve coupling and decoupling by means of the coupling element, the coupling element is equipped with at least one pin that selectively couples and decouples the two levers. Generally, two pins are implemented that are opposite each other in relation to the common axis of rotation of the two levers including the coupling element. In addition, the design is such that the at least one pin passes through an associated recess in the relevant lever. In this context, it is conceivable that the pin not only passes through the recess in question, but can also be moved or displaced within this recess. This is usually achieved by a thrust element, with the aid of which the coupling element can be actuated and moved linearly.

For example, both levers can each be equipped with a recess arranged on the circumference of a circular area. In case two pins are realized that are opposite each other with respect to the axis of rotation, corresponding circumferential recesses are observed with respect to the central axis of rotation.

If the pin is in the interior of the recess, the two levers are coupled together in a rotationally fixed manner. If, however, the pin is moved out of the recess, a relative movement between the two levers is possible and conceivable, as will be explained in more detail below with reference to the description of the figures. As a result of this relative movement, any blockages of the release lever, for example by a motor or electromotive drive or an actuating lever or other blockages, can be easily undone. All that is required for this is that the coupling element decouples the two levers from each other, so that a relative movement between the two levers is possible subsequently thereto.

Since during an opening process the pawl is typically opened against the force of a pawl spring assigned thereto, following such a decoupling of the two levers, the mentioned pawl spring can ensure that the pawl moves and can move into its home position in which the rotary latch is then held during the transition to its closed position. For this purpose, the pawl spring may not only accordingly actuate the pawl, but is additionally, according to the invention, also able to move the pawl release lever relative to the actuating release lever if the actuating release lever should, for example, be blocked.

The thrust element for acting on the coupling element is advantageously a worm wheel. This means that said worm wheel or thrust element usually has a circumferential eccentric or an arc contour for this purpose, with the help of which the coupling element is transferred from its coupled position assumed in the home position to the decoupled position. In fact, a spring may act on the coupling element, which spring pretensions the coupling element in the direction of the position in which it couples the two levers. The decoupled state of the coupling element can now be assumed by actuating the thrust element or worm wheel and moving the coupling element against the force of the spring in question to such an extent that, in the described example, one or both pins leave the associated recess so that the desired relative movement between the pawl release lever and the actuating release lever as both components of the release lever is possible.

In addition and finally, it has proven to be particularly advantageous if the thrust element can be rotated about an axis which runs perpendicular to the axis of the release lever. In this way, the thrust element can work particularly easily on a stop edge of the coupling element, and a compact design is observed.

The invention is based on the knowledge that the coupling element is typically designed to be level with the two levers, which are, moreover, mounted on the same axis. In contrast, the stop edge of the coupling element can describe a plane that is perpendicular to this plane. The axis for the thrust element is usually also arranged in this plane such that rotations about the axis of the thrust element pivot the corresponding arc contour, which then in turn transfers the coupling element via the stop edge from its “coupled” position assumed in the home position to the “decoupled” position with respect to the two levers, namely by means of a linear adjustment process.

Overall, this provides a motor vehicle lock that is of a particularly simple design and is suited both for manual actuation of the specially designed, two-part release lever and in such a way that at this point an electromotive drive is used. Of course, combinations are also conceivable such that the special release lever can be actuated both manually and by an electric motor.

In any case, according to the invention any collisions of the release lever during its pivoting movement, for example with a housing of the motor vehicle lock, blockages by the electromotive drive and/or one or more actuating levers, do not (any longer) result in the associated motor vehicle door not being able to be closed or being closeable only with difficulty following such an opening process.

Rather, in such a case the thrust element actuating the coupling element ensures that the two levers—which are routinely coupled together as components of the release lever—are decoupled or separated from each other via the coupling element. This allows a relative movement, and the pawl as a whole, which is regularly actuated by the locking pawl spring, can move back to its initial position in which, starting therefrom, the rotary latch together with the captured locking bolt is transferred to the locking position, and the locking pawl easily drops in and engages therein.

Finally, it is also conceivable for such malfunctions to be detected, for example, using a sensor. The sensor can be one that senses the pawl. For this purpose, so-called pawl switches are used, for example.

If the relevant sensor or the locking pawl switch detects that, for example, following an electromotive opening process with the aid of the release lever according to the invention, the locking pawl has not reached or has not fully reached its home position for a subsequent closing process of the locking mechanism, this signal can accordingly be evaluated by a control unit to the effect that the thrust element is activated by a motor with its help in order to ensure the described decoupling of the two levers. Of course, it is also possible to decouple the two levers manually. In this case, the thrust element or the worm wheel realized at this point may be coupled to an actuating nut or generally to an actuating means via, for example, a connecting rod or generally a connecting means, so that an operator can manually ensure the desired decoupling of the two levers.

All of this results in an overall functional design and in being able to properly close the associated motor vehicle door even after an electromotive opening process with obstacles. The same applies in the case that the locking mechanism has been opened manually and any subsequent blockages of the release lever or pawl are observed. In all of these cases, the two-part release lever can be decoupled with the aid of the coupling element, so that a relative movement between both levers is permitted and the pawl is accordingly able to assume its home position required for a subsequent closing process with the help of the pawl spring. These are the main advantages.

Figure 3:
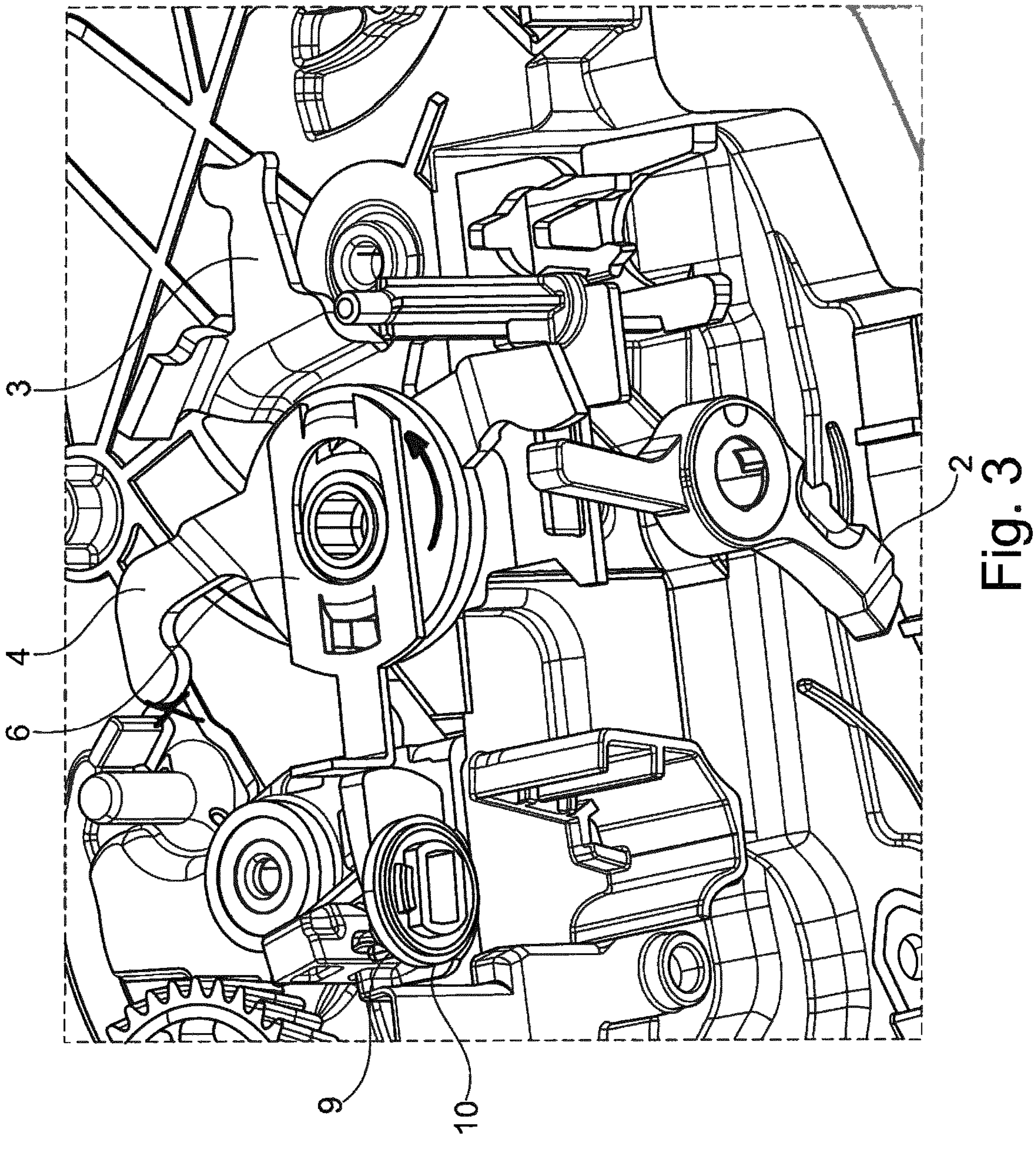
Figure 4:
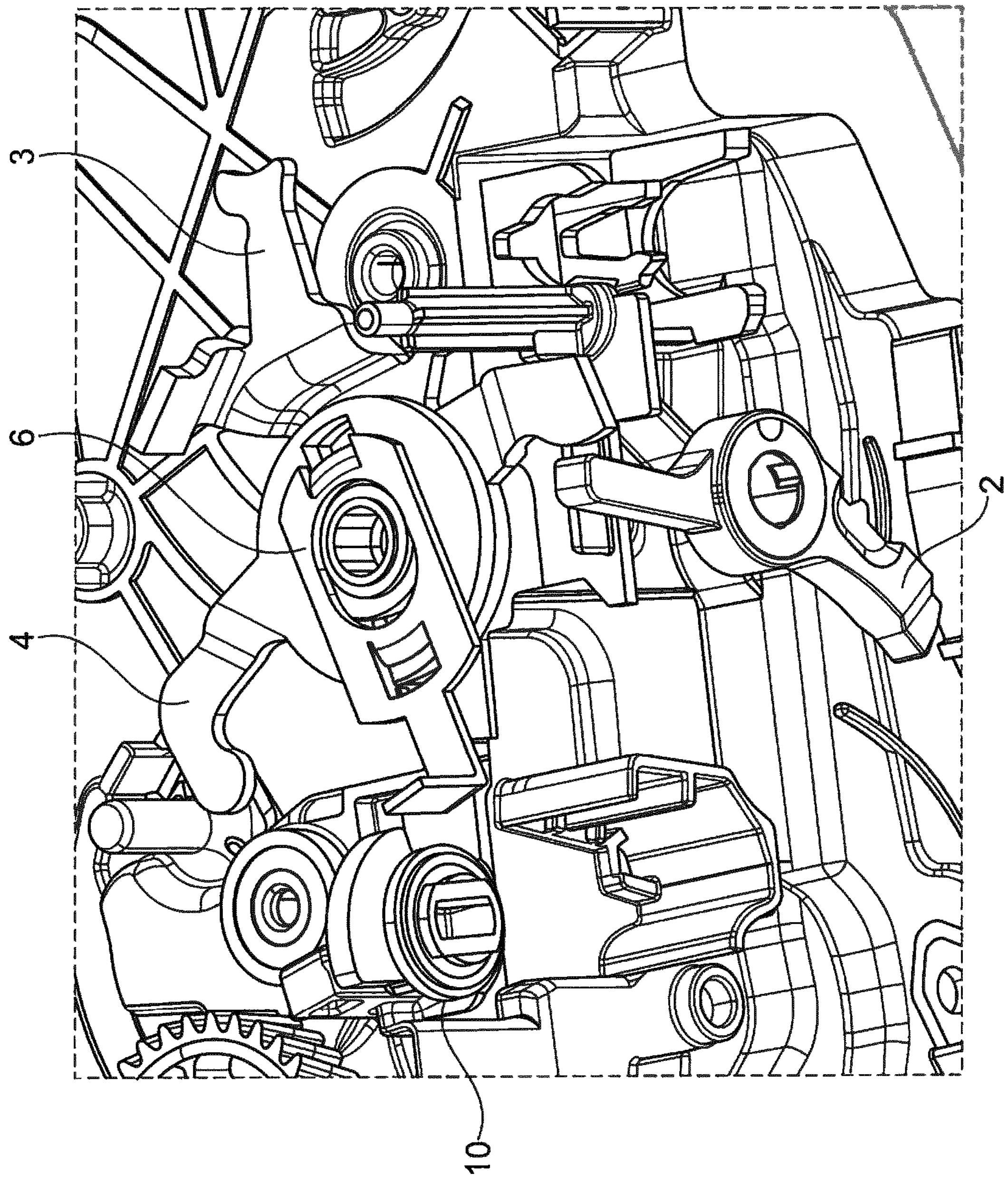

In the following, the invention is explained in more detail with the aid of a drawing showing only an exemplary embodiment; in the figures:

FIG. 1 shows the motor vehicle lock according to the invention in a home position and the functioning of the coupling element in a schematic detail, FIG. 2 shows the subject matter according to FIG. 1 during an electromotive opening process, FIG. 3 shows the subject matter according to FIG. 2 following the opening process according to FIG. 2 and upon actuation of the thrust element for decoupling both levers of the two-part release lever, and FIG. 4 shows the motor vehicle lock according to FIG. 3 during a resetting movement in the decoupled state.

The figures show a motor vehicle lock which is designed as a motor vehicle door lock. For this purpose, the motor vehicle lock or motor vehicle door lock has a locking mechanism consisting substantially of a rotary latch 1 and a pawl 2. The rotary latch 1 is only partially and schematically indicated in FIG. 1. To open the locking mechanism 1, 2, the pawl 2 must perform a pivoting movement in the counterclockwise direction about its axis as indicated in FIG. 1. As a result of this, the rotary latch 1 is also pivoted in the counterclockwise direction indicated in FIG. 1 by, for example, exerted spring forces and, in the fully opened state, releases a locking bolt (not shown). The associated motor vehicle door can be opened.

The further basic design then also includes a release lever 3, 4, which according to the exemplary embodiment is designed in two parts, as will be explained in more detail below. The locking pawl 2 can be actuated with the aid of the release lever 3, 4. Specifically, for the previously mentioned opening process of the locking mechanism 1, 2 and the pivoting movement of the pawl 2 required therefor in the counterclockwise direction indicated in FIG. 1, it is necessary for the release lever 3, 4 to execute the pivoting movement clockwise about its axis or axis of rotation 5 that is also indicated in FIG. 1. This allows a pawl release lever 3 as a component of the two-part release lever 3, 4 to move against an upright arm of the pawl 2 and pivot it in the counterclockwise direction indicated in FIG. 1. The result is that the locking mechanism 1, 2 opens as described.

According to the invention and of particular importance is the fact that the release lever 3, 4 is designed in two parts. In fact, the two-part release lever 3, 4 is firstly composed of the already-mentioned pawl release lever 3 acting on the pawl 2, and additionally of an actuating release lever 4. The actuating release lever 4 can in turn interact with an actuating lever (not expressly shown), an electromotive drive, or both. In principle, said actuating lever and/or the electromotive drive can also act on the pawl release lever 3 in order to pivot the two-part release lever 3, 4 as a whole about the axis of rotation 5 in the clockwise direction indicated in FIG. 1 during the opening of the locking mechanism 1, 2.

Of further essential importance to the invention of the invention is the fact that both levers, i.e., the pawl release lever 3 and the actuating release lever 4, are either coupled together or decoupled from each other via a coupling element 6. For this purpose, the coupling element 6 can be moved linearly, i.e., be designed as linearly displaceable. The coupling element 6 is arranged and mounted on the two levers 3, 4 on the top or bottom (not shown) of the two levers 3, 4 in the same axis and at the same level. This means that the main extension of the coupling element 6 coincides with a plane E spanned by the two levers 3, 4 in the region of the axis of rotation 5. The same applies to the rotational movement of the coupling element 6, which also occurs about the axis of rotation 5 common to the two levers 3, 4.

The coupling element 6 is furthermore and substantially equipped with at least one pin 7 selectively coupling and decoupling the two levers 3, 4. According to the exemplary embodiment, two pins 7 are realized which are opposite each other with respect to the axis of rotation 5, namely diametrically, as can also be understood from the detailed view in FIG. 1. The two pins 7 engage in associated recesses 8 in the relevant lever 3, 4.

In a comparison of the detailed view in FIG. 1 with the perspective view, it can be seen that the two pins 7, like the recesses 8, have an extension in the axial direction of the axis of rotation 5, namely perpendicular to the plane E basically spanned by the coupling element 6 and the two levers 3, 4. As a result, a thrust movement (linear sliding process) indicated by arrows in the detailed view according to FIG. 1 causes the pins 7 to be moved out of the associated recesses 8 due to this thrust movement, namely radially in relation to the axis of rotation 5. The result is that the two levers 3, 4 are coupled to each other when the relevant pin 7 is in a retracted state in the recess 8, whereas the extended state belongs to the decoupled state of the two levers 3, 4.

In order to implement and realize this linear thrust movement already indicated in FIG. 1, an additional thrust element 9 is provided, with the aid of which the coupling element 6 can be actuated. This becomes clear in particular in a comparison of FIGS. 2 and 3 in which the linear thrust movement additionally indicated by an arrow in FIG. 2 is revealed. During this thrust movement with the aid of the thrust element 9, the coupling element 6 with the two opposing pins 7 is moved radially in relation to the axis of rotation 5 and transversely to the recesses 8. Accordingly, the thrust element 9 according to the exemplary embodiment is designed as a worm wheel 9. For this purpose, the thrust element or worm wheel 9 works on a stop edge 6*a* of the coupling element 6.

It can be seen that the stop edge 6*a* of the coupling element 6 extends predominantly perpendicularly in relation to the plane E. In this vertical plane, the thrust element or worm wheel 9 is also equipped with a correspondingly designed arc contour 10 in order to generate the desired thrust movement and linearly move the coupling element 6. For this purpose, the thrust element or worm wheel 9 as a whole is rotatably mounted about an axis 11, which in turn runs perpendicular to the axis of rotation 5 of the release lever 3, 4.

The mode of operation is as follows. In FIG. 1, the motor vehicle lock is shown in a home position. In the transition to FIG. 2, the release lever 3, 4 is actuated for an opening process. This corresponds to the fact that the release lever 3, 4 is actuated about its axis of rotation 5 in the clockwise direction indicated in FIG. 1. At the end of the opening process according to the view in FIG. 2, the stop edge 6*a* of the coupling element 6 is opposite the thrust element or worm wheel 9. Both the pawl release lever 3 and the actuating release lever 4 are coupled to each other in a rotationally fixed manner via the coupling element 6.

If the release lever 3, 4 becomes blocked during this opening process, the coupling element or the coupling slide 6 can then be moved linearly via the thrust element or worm wheel 9 during the transition from FIG. 2 to FIG. 3. This was previously in a position that mechanically couples the two levers 3, 4 with each other. This allows both levers 3, 4 to be pivoted synchronously about the common axis 5 during the opening process of the release lever 3, 4.

If in this context the release lever 3, 4 becomes blocked, as is indicated purely schematically in FIG. 3 by a "cross," the pawl 2 cannot be transferred into its home position with the aid of a pawl spring (not shown). This can be detected by sensor with the aid of the sensor or pawl switch already described above (not expressly shown).

A control unit querying the sensor or pawl switch in question may subsequently ensure that the thrust element 9 is actuated, namely in such a way that the coupling element 6 is moved to the "right" in the exemplary embodiment according to FIG. 2 and indicated by the arrow therein. In this way, the two opposing pins 7 leave their associated recesses 8 so that subsequently and according to the functional view in FIG. 3, the two levers 3, 4 are decoupled from each other. This can lead to a relative movement between the two levers 3, 4 as can be understood in a comparison of FIGS. 2 and 3.

The result is that in the shown example, the pawl release lever 3 is pivoted (slightly) counterclockwise about the axis of rotation 5 during the transition from FIG. 2 to FIG. 3, as indicated by an arrow in FIG. 3. This is ensured by the pawl spring assigned to pawl 2 (not expressly shown). In any case, following the decoupling of the two levers 3, 4, the pawl 2 assumes its home position comparable to the position in FIG. 1. Subsequently, the actuating release lever 4 can also follow the pivoting movement of the pawl release lever 3 as can be understood from the transition from FIG. 3 to FIG. 4. In addition, the coupling element 6 can be returned to its initial position according to the view in FIG. 1. This may be ensured by a spring (not expressly shown) which pretensions the coupling element 6 in the direction of this home position.

LIST OF REFERENCE SIGNS

1 rotary latch
2 pawl

1, 2 locking mechanism
3 pawl release lever
4 actuating release lever
3 release lever
5 axis of rotation
6 coupling element
6*a* stop edge
7 pin
8 recesses
9 thrust element or worm wheel
10 arc contour
11 axis

The invention claimed is:

1. A motor vehicle lock, in particular a motor vehicle door lock, comprising a locking mechanism made up substantially of a rotary latch and a pawl, and a release lever to actuate the pawl and to open the locking mechanism, wherein the release lever is designed in two parts with a pawl release lever acting on the pawl and an actuating release lever interacting with, for example, an actuating lever and/or drive, wherein both levers are either coupled together or decoupled from each other via a linearly displaceable coupling element, wherein both levers are mounted coaxially to each other around a common axis of rotation, and wherein the coupling element is also mounted coaxially to the two levers and is pivoted with them about the common axis of rotation.

2. The motor vehicle lock according to claim 1, wherein the coupling element is equipped with at least one pin selectively coupling and decoupling the two levers.

3. The motor vehicle lock according to claim 2, wherein two pins are provided opposite each other with respect to the axis of rotation.

4. The motor vehicle lock according to claim 2, wherein the at least one pin engages in an associated recess in the relevant lever.

5. The motor vehicle lock according to claim 1, wherein the coupling element can be actuated by means of a thrust element.

6. The motor vehicle lock according to claim 5, wherein the thrust element is designed as a worm wheel.

7. The motor vehicle lock according to claim 5, wherein the thrust element works on a stop edge of the coupling element.

8. The motor vehicle lock according to claim 5, wherein the thrust element is rotatable about an axis which runs perpendicular to the axis of rotation of the release lever.

9. A motor vehicle lock, in particular a motor vehicle door lock, comprising a locking mechanism made up substantially of a rotary latch and a pawl, and a release lever to actuate the pawl and to open the locking mechanism, wherein the release lever is designed in two parts with a pawl release lever acting on the pawl and an actuating release lever interacting with, for example, an actuating lever and/or drive, wherein both levers are either coupled together or decoupled from each other via a linearly displaceable coupling element, wherein the coupling element is equipped with at least one pin selectively coupling and decoupling the two levers, and wherein two pins are provided opposite each other with respect to the axis of rotation.

10. A motor vehicle lock, in particular a motor vehicle door lock, comprising a locking mechanism made up substantially of a rotary latch and a pawl, and a release lever to actuate the pawl and to open the locking mechanism, wherein the release lever is designed in two parts with a pawl release lever acting on the pawl and an actuating release lever interacting with, for example, an actuating lever and/or drive, wherein both levers are either coupled together or decoupled from each other via a linearly displaceable coupling element, wherein the coupling element is actuated by means of a thrust element, and wherein the thrust element is rotatable about an axis which runs perpendicular to an axis of rotation of the release lever.

* * * * *